(12) United States Patent
Wang et al.

(10) Patent No.: US 12,053,969 B2
(45) Date of Patent: Aug. 6, 2024

(54) METHOD OF PRODUCING AUTOMOTIVE INTERIOR ARTICLES INCLUDING FRIMS

(71) Applicants: Ruomiao Wang, Forest, VA (US); Jesse Hipwell, Grand Blanc, MI (US); Richard Hausman, Waterville, OH (US)

(72) Inventors: Ruomiao Wang, Forest, VA (US); Jesse Hipwell, Grand Blanc, MI (US); Richard Hausman, Waterville, OH (US)

(73) Assignee: Hanwha Azdel, Inc., Forest, VA (US)

(*) Notice: Subject to any disclaimer, the term of this patent is extended or adjusted under 35 U.S.C. 154(b) by 946 days.

(21) Appl. No.: 16/920,579

(22) Filed: Jul. 3, 2020

(65) Prior Publication Data
US 2021/0101360 A1  Apr. 8, 2021

Related U.S. Application Data

(63) Continuation of application No. 14/063,214, filed on Oct. 25, 2013, now abandoned.
(Continued)

(51) Int. Cl.
*B29C 70/68* (2006.01)
*B32B 5/02* (2006.01)
(Continued)

(52) U.S. Cl.
CPC .............. *B32B 5/10* (2013.01); *B29C 70/68* (2013.01); *B32B 5/026* (2013.01); *B32B 5/028* (2013.01); *B32B 5/142* (2013.01); *B32B 27/08* (2013.01); *B32B 27/12* (2013.01); *B32B 27/20* (2013.01); *B32B 27/32* (2013.01); *B32B 27/34* (2013.01); *B32B 37/02* (2013.01); *B29K 2023/06* (2013.01); *B29K 2023/12* (2013.01); *B29K 2077/00* (2013.01); *B29K 2105/04* (2013.01); *B29K 2105/0809* (2013.01); *B29K 2105/0854* (2013.01); *B29K 2105/12* (2013.01); *B29K 2267/003* (2013.01); *B29K 2509/08* (2013.01); *B32B 2262/02* (2013.01);
(Continued)

(58) Field of Classification Search
None
See application file for complete search history.

(56) References Cited

U.S. PATENT DOCUMENTS 4,469,543 A * 9/1984 Segal ............ B32B 27/36
156/283
4,692,375 A * 9/1987 Neubauer ......... D04H 3/03
428/297.4
(Continued)

FOREIGN PATENT DOCUMENTS

WO  WO-2012061032 A1 * 5/2012 ........... C04B 14/042

*Primary Examiner* — Benjamin A Schiffman
(74) *Attorney, Agent, or Firm* — Rhodes IP PLC; Christopher R Rhodes

(57) ABSTRACT

Certain embodiments described herein are directed to articles that provide less sag. In some examples, the articles can include a fiber reinforced thermoplastic polymer core layer comprising reinforcing fibers and a thermoplastic polymer, and a frim disposed on the fiber reinforced polymer core layer. In certain examples, the frim comprises a film coupled to a scrim comprising an effective basis weight to prevent substantial sag of the article, e.g., during a forming operation.

20 Claims, 2 Drawing Sheets

Related U.S. Application Data

(60) Provisional application No. 61/725,956, filed on Nov. 13, 2012.

(51) Int. Cl.
| | | |
|---|---|---|
| *B32B 5/10* | (2006.01) | |
| *B32B 5/14* | (2006.01) | |
| *B32B 27/08* | (2006.01) | |
| *B32B 27/12* | (2006.01) | |
| *B32B 27/20* | (2006.01) | |
| *B32B 27/32* | (2006.01) | |
| *B32B 27/34* | (2006.01) | |
| *B32B 37/02* | (2006.01) | |
| *B29K 23/00* | (2006.01) | |
| *B29K 77/00* | (2006.01) | |
| *B29K 105/04* | (2006.01) | |
| *B29K 105/08* | (2006.01) | |
| *B29K 105/12* | (2006.01) | |
| *B29K 267/00* | (2006.01) | |
| *B29K 509/08* | (2006.01) | |

(52) U.S. Cl.
CPC ....... *B32B 2262/06* (2013.01); *B32B 2262/10* (2013.01); *B32B 2262/101* (2013.01); *B32B 2307/718* (2013.01); *B32B 2605/00* (2013.01); *Y10T 442/10* (2015.04)

(56) References Cited

U.S. PATENT DOCUMENTS

| | | | | |
|---|---|---|---|---|
| 4,734,321 A | * | 3/1988 | Radvan | B29C 70/12 428/323 |
| 4,767,321 A | * | 8/1988 | Chilva | F26B 15/18 34/208 |
| 4,793,802 A | * | 12/1988 | Chilva | F27B 9/28 110/216 |
| 4,802,843 A | * | 2/1989 | Chilva | F27B 9/28 432/59 |
| 4,950,532 A | * | 8/1990 | Das | B29C 35/02 264/327 |
| 5,348,798 A | * | 9/1994 | Berghuis | B29C 70/46 264/258 |
| 5,601,679 A | * | 2/1997 | Mulcahy | B29C 51/12 264/510 |
| 5,643,989 A | * | 7/1997 | Van De Grampel | C03C 25/34 524/495 |
| 5,824,973 A | * | 10/1998 | Haines | B32B 5/22 181/294 |
| 6,286,879 B1 | * | 9/2001 | Haque | B60R 19/18 293/120 |
| 6,756,099 B2 | * | 6/2004 | Araki | B32B 27/08 428/41.5 |
| 6,756,332 B2 | * | 6/2004 | Sandoe | D04H 1/559 442/361 |
| 6,923,494 B2 | * | 8/2005 | Shuler | B60R 19/18 296/187.05 |
| 7,157,034 B2 | * | 1/2007 | Bristow | B60R 13/0225 264/510 |
| 7,244,501 B2 | * | 7/2007 | Raghavendran | B32B 27/08 428/494 |
| 7,318,498 B2 | * | 1/2008 | Woodman | B60R 13/0815 181/290 |
| 7,431,980 B2 | * | 10/2008 | Woodman | D04H 1/4266 428/297.4 |
| 7,482,048 B2 | * | 1/2009 | Boutghrit | D04H 1/04 428/33 |
| 7,682,697 B2 | * | 3/2010 | Raghavendran | B32B 5/28 428/292.1 |
| 7,759,267 B2 | * | 7/2010 | Conover | B29C 70/345 264/258 |
| 7,837,911 B2 | * | 11/2010 | Bristow | B29C 51/145 264/510 |
| 7,972,685 B2 | * | 7/2011 | Raghavendran | D04H 1/4218 428/297.4 |
| 8,568,853 B2 | * | 10/2013 | Raghavendran | B32B 5/022 428/113 |
| RE44,893 E | * | 5/2014 | Raghavendran | D21H 21/34 428/412 |
| 8,920,915 B2 | * | 12/2014 | Kunal | B32B 27/36 428/297.4 |
| 11,634,550 B2 | * | 4/2023 | Wang | B27N 7/005 428/311.51 |
| 2002/0006755 A1 | * | 1/2002 | North | B60R 13/0225 442/50 |
| 2004/0097159 A1 | * | 5/2004 | Balthes | B32B 39/00 442/415 |
| 2004/0231915 A1 | * | 11/2004 | Thompson, Jr. | B32B 27/065 181/290 |
| 2007/0196637 A1 | * | 8/2007 | Good | C08J 5/043 428/297.4 |
| 2007/0269645 A1 | * | 11/2007 | Raghavendran | B32B 5/28 428/297.4 |
| 2008/0008869 A1 | * | 1/2008 | Good | B32B 5/28 264/45.3 |
| 2008/0032094 A1 | * | 2/2008 | Raghavendran | C08J 5/04 428/317.1 |
| 2008/0070019 A1 | * | 3/2008 | Good | D06B 1/00 428/218 |
| 2013/0101822 A1 | * | 4/2013 | Kunal | B32B 27/34 428/339 |
| 2016/0168350 A1 | * | 6/2016 | Tseng | B32B 5/22 521/60 |
| 2017/0129145 A1 | * | 5/2017 | Wang | B29C 44/128 |
| 2017/0225429 A1 | * | 8/2017 | Yu | B32B 27/281 |
| 2019/0255822 A1 | * | 8/2019 | Wang | B32B 21/02 |
| 2020/0130611 A1 | * | 4/2020 | Wei | B32B 27/36 |
| 2020/0290310 A1 | * | 9/2020 | Wang | B32B 27/288 |
| 2021/0354344 A1 | * | 11/2021 | Chen | B32B 15/20 |
| 2022/0266583 A1 | * | 8/2022 | Wei | B32B 37/06 |

\* cited by examiner

METHOD OF PRODUCING AUTOMOTIVE INTERIOR ARTICLES INCLUDING FRIMS

PRIORITY APPLICATION

This application claims priority to U.S. Provisional Application No. 61/725,956 filed on Nov. 13, 2012, the entire disclosure of which is hereby incorporated herein by reference for all purposes.

TECHNOLOGICAL FIELD

This application is related to articles that include one or more frim layers. In particular, certain embodiments herein are directed to articles including a thermoplastic polymer core layer and a film and scrim layer disposed on the thermoplastic polymer core layer.

BACKGROUND

Articles for automotive and construction materials applications typically are designed to meet a number of competing and stringent performance specifications. Parts produced using the articles can sag resulting in failure during a forming operation or failure of the part.

SUMMARY

In one aspect, a thermoplastic composite article comprising a fiber reinforced thermoplastic polymer core layer comprising reinforcing fibers and a thermoplastic polymer, and a frim disposed on the fiber reinforced polymer core layer, the frim comprising a film coupled to a scrim comprising an effective basis weight to prevent substantial sag of the article, e.g., during a forming operation such as, for example, molding or generally preventing sag of the final, formed article when it is placed in its use environment. In some embodiments, the frim may comprise a basis weight effective to prevent sag of a core layer comprising a basis weight of about 550-650 grams per square meter (gsm).

In certain embodiments, the scrim of the frim comprises a basis weight of at least 30 gsm. In other embodiments, the scrim of the frim comprises a basis weight of at least 45 gsm. In additional embodiments, the scrim of the frim comprises a basis weight of at least 40 gsm or 50 gsm. In certain embodiments, the film of the frim comprises a basis weight of at least 15 gsm. In other embodiments, the film of the frim comprises a basis weight of at least 30 gsm or 45 gsm. In additional embodiments, the film of the frim comprises a basis weight of at least 50 gsm.

In some embodiments, the scrim comprises a basis weight of at least 30 gsm and the film comprises a basis weight of at least 30 gsm. In other embodiments, the scrim comprises a basis weight of at least 30 gsm and the film comprises a basis weight of at least 45 gsm. In additional embodiments, the scrim comprises a basis weight of at least 30 gsm and the film comprises a basis weight of at least 40 gsm or 50 gsm. In further embodiments, the scrim comprises a basis weight of at least 45 gsm and the film comprises a basis weight of at least 30 gsm. In additional embodiments, the scrim comprises a basis weight of at least 45 gsm and the film comprises a basis weight of at least 45 gsm. In further embodiments, the scrim comprises a basis weight of at least 45 gsm, and the film comprises a basis weight of at least 40 gsm or 50 gsm. In some examples, the scrim comprises a basis weight of at least 40 gsm or 50 gsm, and the film comprises a basis weight of at least 30 gsm. In some embodiments, the scrim comprises a basis weight of at least 40 gsm or 50 gsm, and the film comprises a basis weight of at least 45 gsm. In other embodiments, the scrim comprises a basis weight of at least 40 gsm or 50 gsm, and the film comprises a basis weight of at least 40 gsm or 50 gsm.

In certain examples, the film can be coupled to the scrim with an adhesive. In some embodiments, the film is melt bonded to the scrim. In additional embodiments, the scrim comprises polyethylene terephthalate. In some embodiments, the film comprises a polyamide. In other embodiments, the polyamide can be nylon 6. In certain embodiments, the film comprises polypropylene and the scrim comprises polyethylene terephthalate.

In certain embodiments, each of the scrim and the film can independently comprise at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

In some embodiments, the film of the frim can comprise a plurality of layers. In certain instances, at least one layer of the plurality of layers comprises a polyethylene. In other instances, at least one layer of the plurality of layers comprises a polyamide. In further examples, the film comprises a first polyethylene layer coupled to a polyamide layer and a second polyethylene layer coupled to the polyamide layer.

In some embodiments, the article can include a film layer disposed on a surface opposite a surface where the frim is disposed. In certain examples, the film layer disposed on the surface opposite the surface where the frim is disposed comprises polypropylene.

In certain embodiments, the articles described herein can be configured to sag less than an amount to contact the frame or mold of the molding device. For example, the article can be configured to sag less than a desired amount such that a molded article produced from the article can be removed from an oven without sag that would contact the oven frame. In some embodiments, the scrim is effective to prevent sag of the article during the molding operation.

In certain embodiments, the film is coupled to the scrim with an adhesive. In some embodiments, the scrim comprises polyethylene terephthalate. In other embodiments, the film comprises a polyamide. In other embodiments, the polyamide is nylon 6. In additional embodiments, the film comprises polypropylene and the scrim comprises polyethylene terephthalate.

In some embodiments, the film comprises a plurality of layers. In some examples, at least one layer of the plurality of layers comprises a polyethylene. In additional examples, at least one layer of the plurality of layers comprises a polyamide. In some examples, the film comprises a first polyethylene layer coupled to a polyamide layer and a second polyethylene layer coupled to the polyamide layer.

In certain embodiments, the article can include a film layer disposed on a surface opposite a surface where the scrim is disposed. In some examples, the film layer can be disposed on the surface opposite the surface where the scrim is disposed comprises polypropylene. In some embodiments, the article can include a fabric layer coupled to the film layer disposed on the surface opposite the surface where scrim is disposed.

In certain embodiments, the core layer comprises glass reinforcing fibers. In additional embodiments, the reinforcing fibers comprise one or more of carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

In some embodiments, the core layer is permeable and comprises a density of about 0.1 $gm/cm^3$ to about 1.8 $gm/cm^3$. In certain embodiments, the core layer comprises a porosity between about 20% to about 80% by volume of the core layer. In other embodiments, the thermoplastic polymer comprises one or more of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In some examples, the thermoplastic core layer comprises glass reinforcing fibers and a thermoplastic polymer comprises polypropylene, the film comprises a polyamide and the scrim comprises a polyethylene terephthalate.

In certain embodiments, the article can include a polypropylene film disposed on an opposite surface from a surface where the scrim is disposed.

In another aspect, a thermoplastic composite article comprising a fiber reinforced thermoplastic polymer core layer comprising reinforcing fibers and a thermoplastic polymer, a barrier layer coupled to and disposed on the core layer, and a scrim layer coupled to and disposed on the barrier layer, in which the scrim comprises an effective basis weight to prevent substantial sag of the article, e.g., during a forming operation such as, for example, molding. In some embodiments, the scrim may comprise a basis weight effective to prevent sag of a core layer comprising a basis weight of about 550-650 gsm.

In certain examples, the barrier layer can be coupled to the scrim with an adhesive and the barrier layer can be coupled to the core layer with an adhesive. In other embodiments, the scrim comprises polyethylene terephtalate. In further examples, the bather layer comprises one of a polyamide, a polypropylene, a polyethylene and copolymers thereof. In some embodiments, the polyamide is nylon 6. In other embodiments, the film comprises polypropylene and the scrim comprises polyethylene terephtalate. In some examples, the barrier layer comprises a plurality of layers. In additional examples, at least one layer of the plurality of layers comprises a polyethylene. In other examples, at least one layer of the plurality of layers comprises a polyamide. In some embodiments, the barrier layer comprises a first polyethylene layer coupled to a polyamide layer and a second polyethylene layer coupled to the polyamide layer, in which the polyethylene layers are effective to adhere the polyamide layer to the core layer and the scrim without the use of an adhesive.

In certain embodiments, the article can include a film layer disposed on a surface opposite a surface where the scrim is disposed. In some embodiments, the film layer disposed on the surface opposite the surface where the scrim is disposed comprises polypropylene.

In certain examples, the article can also include a fabric layer coupled to the film layer disposed on the surface opposite the surface where scrim is disposed. In some examples, the core layer comprises glass reinforcing fibers. In other embodiments, the reinforcing fibers of the core layer comprise one or more of carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

In some examples, the core layer is permeable and comprises a density of about 0.1 $gm/cm^3$ to about 1.8 $gm/cm^3$. In additional examples, the core layer a porosity between about 20% to about 80% by volume of the core layer. In some examples, the thermoplastic polymer of the core layer comprises one or more of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In some embodiments, the thermoplastic core layer comprises glass reinforcing fibers and a thermoplastic polymer comprises polypropylene, the film comprises a polyamide and the scrim comprises a polyethylene terephthalate. In additional embodiments, the article can comprise a polypropylene film disposed on an opposite surface from a surface where the scrim is disposed.

In another aspect, a method of facilitating assembly of a vehicle, the method comprising providing a thermoplastic composite article comprising a fiber reinforced thermoplastic polymer core layer comprising reinforcing fibers and a thermoplastic polymer, and a frim disposed on the fiber reinforced polymer core layer, the frim comprising a film coupled to a scrim comprising an effective basis weight to prevent substantial sag of the article, e.g., during a forming operation such as, for example, molding or generally preventing sag of the final, formed article when it is placed in its use environment. In some embodiments, the film and/or scrim may comprise a basis weight effective to prevent sag of a core layer comprising a basis weight of about 550-650 gsm.

In certain embodiments, the method can include configuring the vehicle part to be a headliner of vehicle. In other embodiments, the method can include configuring the article with a film layer on a surface of the core layer opposite the surface of the core layer where the frim is disposed. In some examples, the method can include coupling the article to a foam layer. In certain examples, the method can include coupling the foam to a fabric layer.

In an additional aspect, a method of facilitating assembly of a vehicle can include providing a thermoplastic composite article comprising a fiber reinforced thermoplastic polymer core layer comprising reinforcing fibers and a thermoplastic polymer, a film disposed on the polymer core layer, and a scrim disposed on the film, in which the scrim comprises an effective basis weight to prevent substantial sag of the article, e.g., during a forming operation such as, for example, molding or generally preventing sag of the final, formed article when it is placed in its use environment. In some embodiments, the frim may comprise a basis weight effective to prevent sag of a core layer comprising a basis weight of about 550-650 gsm.

In certain embodiments, the method can include configuring the vehicle part to be a headliner of vehicle. In other embodiments, the method can include configuring the article with a film layer on a surface of the core layer opposite the surface of the core layer where the scrim is disposed. In some examples, the method can include coupling the article to a foam layer. In certain examples, the method can include coupling the foam to a fabric layer.

In another aspect, a method of facilitating assembly of a vehicle can include providing a thermoplastic composite article comprising a fiber reinforced thermoplastic polymer core layer comprising reinforcing fibers and a thermoplastic polymer, a barrier layer coupled to and disposed on the core layer, and a scrim layer coupled to and disposed on the barrier layer, in which the scrim comprises an effective basis weight to prevent substantial sag of the article, e.g., during a forming operation such as, for example, molding or generally preventing sag of the final, formed article when it is placed in its use environment. In some embodiments, the frim may comprise a basis weight effective to prevent sag of a core layer comprising a basis weight of about 550-650 gsm.

In certain embodiments, the method can include configuring the vehicle part to be a headliner of vehicle. In other embodiments, the method can include configuring the article with a film layer on a surface of the core layer opposite the surface of the core layer where the scrim is disposed. In some examples, the method can include coupling the article to a foam layer. In further examples, the method can include coupling the foam to a fabric layer.

Additional features, aspect, examples and embodiments are described in more detail below.

BRIEF DESCRIPTION OF THE DRAWINGS

Certain embodiments are described with reference to the accompanying figures in which.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar material, if desired.

DETAILED DESCRIPTION

Certain embodiments are described below with reference to singular and plural terms in order to provide a user friendly description of the technology disclosed herein. These terms are used for convenience purposes only and are not intended to limit the articles, composites and other subject matter as including or excluding certain features unless otherwise noted as being present in a particular embodiment described herein.

In certain examples described herein, the articles can include a frim that comprises an effective basis weight to prevent substantial sag of the article during a forming operation. In some embodiments, the scrim of the frim comprises the effective basis weight to prevent substantial sag of the article during a forming operation. As used herein, a forming operation is generally understood to include, but is not limited to, heating, molding or pressure or temperature processing of the article to provide a final part or article. For example, the frims and/or scrims of the frims used herein may be effective to reduce sag of the article when it is heated in an infrared oven to avoid or reduce the possibility of fire in the oven. In other instances, the frims and/or scrims of the frims used herein may be effective to reduce sag when a heated article is transferred out of an oven. In additional examples, the frims and/or scrims of the frims used herein may be effective to reduce sag when a heated article is transferred into a molding apparatus. Additional similar types of forming operations that may be used with the articles described herein will be readily selected by the person of ordinary skill in the art, given the benefit of this disclosure.

Figure 1:
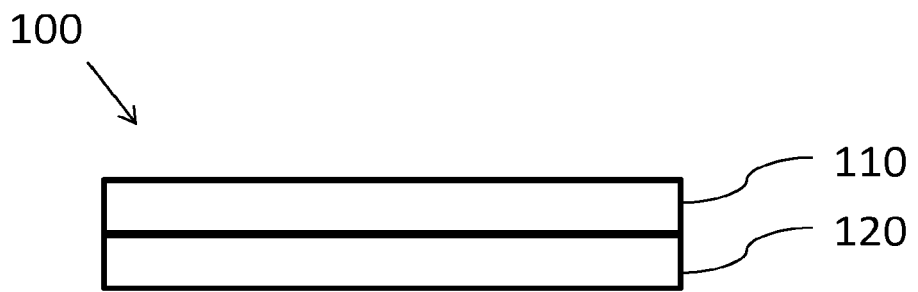
FIG. 1 is a side view of an illustration of a frim, in accordance with certain examples.

In certain embodiments, the articles described herein can include one or more frims or frim layers. The term frim refers to a combination of a scrim and a film. For example, and referring to FIG. 1, the frim 100 comprises a scrim 110 and a film 120. The frim 100 may be used or present in the form of a prepreg that includes the scrim 110 coupled to a film 120 through suitable bonding, adhesives or other forms. In some embodiments, the frim 100 may be pre-processed by heating the materials to a suitable temperature to soften the materials. In certain examples, the frim 100 can be heated to a desired temperature such that the scrim 110 and film 120 are melted and coupled to each other to provide a frim without any discernible interface within it. In use, the scrim of the frim may be present on an outer surface of the article, whereas in other configurations, the film of the frim may be present on an outer surface of the article.

In certain embodiments, the scrim used in the frim may be a heavy weight scrim. For example, typical scrims used in existing articles are lightweight, e.g., 10 gsm or less, so as to not increase the overall weight of the article to a substantial degree. In certain embodiments, the scrim present in the frim may have a basis weight of at least 30 gsm, more particularly a basis weight of at least 35 gsm, for example, a basis weight greater than 40 gsm, 45 gsm, 50 gsm, 55 gsm, 60 gsm, 65 gsm, 70 gsm or 75 gsm. Depending on the thickness and construction of the scrim however, the basis weight can be lower, e.g., 15 gsm-30 gsm. In certain examples, the scrim may be about 0.075 mm thick to about 2 mm thick, more particularly, about 0.1 mm thick to about 1 mm thick, for example, about 0.1 mm thick to about 0.70 mm thick.

In certain examples, the scrim can be disposed as a generally planar layer that covers substantially all of a surface on one side of the film layer. For example, the scrim can be disposed as a layer that overlies the film and generally is continuous from side to side of the film layer. If desired, the scrim can be disposed on both sides of a film layer to sandwich the film between scrim layers. Where a film layer is sandwiched between two or more scrim layers, the scrim on each side of the film may be the same or may be different. In addition, while the scrim on each side of the film may comprise the same material, the basis weight of the scrim on each side may be different. For example, the scrim on each side of the film may comprise polypropylene or polyethylene terephthalate but the basis weight of one scrim may be larger than the basis weight of the other scrim. In some embodiments, the scrim closest to the outer surface of the final article may have the higher basis weight, whereas in other examples, the scrim closest to the outer surface of the final article may have the lower basis weight. If desired, the scrim may comprise two or more layers coupled to each other to form the overall scrim that is used. For example, the scrim may include a plurality of layers of material adhered, melted or coupled to each other to provide a final scrim that can be coupled to a film and used as a frim as described herein. If desired, adjacent layers of the film may comprise scrim material or different scrim layers can be separated by the film or one or more other materials.

Figure 2:
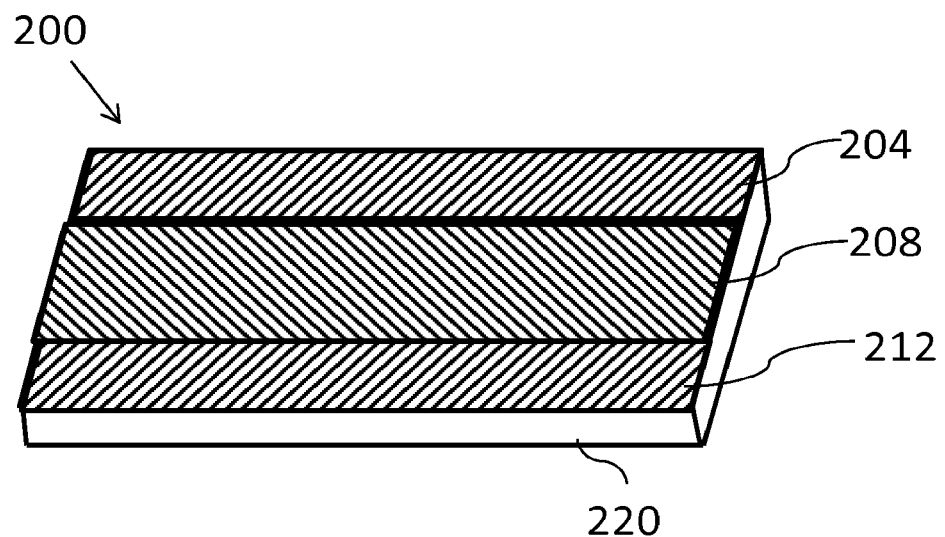
FIG. 2 is a perspective view of a frim comprising more than a single scrim, in accordance with certain examples.

In some embodiments, the scrim may have areas comprising a different basis weight to provide increased strength in those areas. For example, the scrim may predominantly have a basis weight of 30 gsm but certain areas or zones may have an increased basis weight, e.g., 45 gsm, to reduce sag in those areas. To provide such areas with increased basis weight, the scrim may be disposed on the film as patches or strips of scrim material. For example and referring to FIG. 2, a perspective view of a frim 200 is shown. The frim 200 comprises a plurality of scrims 204, 208 and 212 disposed on a film 220. In certain instances, the scrim layers or strips 204 and 208 comprise a different basis weight than the scrim layer 212. In some embodiments, the strips 204 and 208 may comprise the same basis weight, whereas in other embodiments, the strips 204 and 208 may comprise a different basis weight. In certain examples, strip 204 has a larger basis weight than strips 208 and 212. In certain embodiments, strip 208 has a larger basis weight than strips 204 and 212. In other embodiments, strip 212 has a larger basis weight than strip 204 and 208.

In certain embodiments, the strips 204 and 212 may have a basis weight of about 30 gsm and the strip 208 may have a basis weight of about 35 gsm or greater, a basis weight of 40 gsm or greater, a basis weight of 45 gsm or greater or a basis weight of 50 gsm or greater. In other examples, the strips 204 and 212 may have a basis weight of about 35 gsm and the strip 208 may have a basis weight of about 40 gsm or greater, a basis weight of 45 gsm or greater or a basis weight of 50 gsm or greater. In certain examples, the strips 204 and 212 may have a basis weight of about 40 gsm and the strip 208 may have a basis weight of about 45 gsm or greater, a basis weight of 50 gsm or greater or a basis weight of 55 gsm or greater. In certain embodiments, the strips 204 and 212 may have a basis weight of about 45 gsm and the strip 208 may have a basis weight of about 50 gsm or greater, a basis weight of 55 gsm or greater or a basis weight of 60 gsm or greater.

In certain examples, the strip 208 may have a basis weight of about 30 gsm and the strips 204 and 212 each independently may have a basis weight of about 35 gsm or greater, a basis weight of 40 gsm or greater, a basis weight of 45 gsm or greater or a basis weight of 50 gsm or greater. In other examples, the strip 208 may have a basis weight of about 35 gsm and the strips 204 and 212 each independently may have a basis weight of about 40 gsm or greater, a basis weight of 45 gsm or greater or a basis weight of 50 gsm or greater. In certain examples, the strip 208 may have a basis weight of about 40 gsm and the strips 204 and 212 each independently may have a basis weight of about 45 gsm or greater, a basis weight of 50 gsm or greater or a basis weight of 55 gsm or greater. In certain embodiments, the strip 208 may have a basis weight of about 45 gsm and the strips 204 and 212 each independently may have a basis weight of about 50 gsm or greater, a basis weight of 55 gsm or greater or a basis weight of 60 gsm or greater.

In certain embodiments, the scrim may comprise one or more thermoplastic polymer materials. For example, the scrim can include one or more thermoplastic resins such as, for example, a polyolefin resin, a thermoplastic polyolefin blend resin, a polyvinyl polymer resin, a butadiene polymer resin, an acrylic polymer resin, a polyamide resin, a polyester resin, a polycarbonate resin, a polypropylene resin, a polyestercarbonate resin, a polystyrene resin, an acrylonitrylstyrene polymer resin, an acrylonitrile-butylacrylate-styrene polymer resin, a polyimide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, a polyethylene terephthalate resin and copolymers, mixtures and combinations thereof. In some embodiments, the scrim can include two polymer resins, three polymer resins, four polymer resins or more. In other examples, different portions of the scrim can include different polymer material compositions.

In other embodiments, the scrim may comprise a material with a melting point of greater than 200° C., more particularly greater than 225° C., for example, a material with a melting point greater than 250° C. or greater than 260° C., e.g., a melting point between 250-260° C. If desired, the material may be a thermoplastic polymer such as, for example, a thermoplastic resin or two or more thermoplastic resins.

In certain embodiments, the scrim can include reinforcing materials. In some embodiments, the reinforcing materials can be one or more types of fibers. Illustrative types of fibers include, but are not limited to, glass fibers, carbon fibers, graphite fibers, synthetic organic fibers, particularly high modulus organic fibers such as, for example, para- and meta-aramid fibers, nylon fibers, polyester fibers, or any of the resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers present in the scrim can be chemically treated prior to use to provide desired functional groups or to impart other physical properties to the fibers. The fiber content in the scrim may be from about 1% to about 90%, more particularly from about 30% to about 70%, by weight of the scrim. Typically, the fiber content of the scrim varies between about 20% to about 90% by weight, more particularly between about 40% to about 80% by weight of the scrim. The particular size and/or orientation of the fibers used may depend, at least in part, on the polymer material used and/or the desired properties of the resulting article. Suitable additional types of fibers, fiber sizes and amounts will be readily selected by the person of ordinary skill in the art, given the benefit of this disclosure. In some examples, fibers present in the scrim generally have a diameter of greater than about 5 microns, more particularly from about 5 microns to about 22 microns, and a length of from about 5 mm to about 200 mm; more particularly, the fiber diameter may be from about 10 microns to about 22 microns and the fiber length may be from about 5 mm to about 75 mm. In other embodiments, different types of fibers can be present in the scrim. The different types of fibers may comprise different materials, different fiber lengths, different fiber diameters or combinations thereof.

In certain examples, the film of the frim may comprise a suitable basis weight to impart desired properties to the final article where the frim is used. In certain embodiments, the film comprises a basis weight of at least 30 gsm. In some embodiments, the film comprises a basis weight of about 15 gsm to about 75 gsm, more particularly about 20 gsm to about 55 gsm, for example, about 22 gsm to about 50 gsm. If desired, the film may be porous or may be non-porous. The film may be clear, colored or make include pigments, dyes or other additives as desired. In certain examples, the film may be about 0.05 mm thick to about 2 mm thick, more particularly, about 0.1 mm thick to about 1.5 mm thick, for example, about 0.5 mm thick to about 1 mm thick.

In some embodiments, the film may be effective to function as a barrier layer that is effective to prevent substantial adsorption of odors, colored fluids or other materials on the final article. For example, the film may be effective to ensure cigarette smoke, diesel exhaust, bad odors and the like are not adsorbed and/or retained by the article. Where the article is exposed to an agent that is a liquid, the film can be effective to prevent soaking of the fluid into the underlying materials, which could result in formation of mold, discoloration of the article or permanent staining of the article.

In certain examples, the film may comprise one or more of a polyolefin, a polyamide or combinations thereof. Where a polyamide is used, the polyamide may be an aliphatic polyamide (e.g., nylon), an aromatic polyamide, a semi-aromatic polyamide or combinations or copolymers thereof. In other embodiments, the film may comprise one or more thermoplastic resins such as, for example, a polyolefin resin, a thermoplastic polyolefin blend resin, a polyvinyl polymer resin, a butadiene polymer resin, an acrylic polymer resin, a polyamide resin, a polyester resin, a polycarbonate resin, a polypropylene resin, a polyestercarbonate resin, a polystyrene resin, an acrylonitrylstyrene polymer resin, an acrylonitrile-butylacrylate-styrene polymer resin, a polyimide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, a polyethylene terephthalate resin and copolymers, mixtures and combinations thereof. In some embodiments, the film can include two polymer resins, three polymer resins, four polymer resins or more. In other examples, different portions of the film can include different polymer material compositions.

In some examples, the film may comprise reinforcing materials. In some embodiments, the reinforcing materials can be one or more types of fibers. Illustrative types of fibers suitable for use in the films include, but are not limited to, glass fibers, carbon fibers, graphite fibers, synthetic organic fibers, particularly high modulus organic fibers such as, for example, para- and meta-aramid fibers, nylon fibers, polyester fibers, or any of the resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers present in the film can be chemically treated prior to use to provide desired functional groups or to impart other physical properties to the fibers.

The fiber content in the film may be from about 0% to about 90%, more particularly from about 30% to about 70%, by weight of the film. Typically, the fiber content of the film varies between about 5% to about 90% by weight, more particularly between about 40% to about 80% by weight of the film. The particular size and/or orientation of the fibers used may depend, at least in part, on the polymer material used and/or the desired properties of the resulting article. Suitable additional types of fibers, fiber sizes and amounts will be readily selected by the person of ordinary skill in the art, given the benefit of this disclosure. In some examples, fiber present in the film generally have a diameter of greater than about 5 microns, more particularly from about 5 microns to about 22 microns, and a length of from about 5 mm to about 200 mm; more particularly, the fiber diameter may be from about 10 microns to about 22 microns and the fiber length may be from about 5 mm to about 75 mm In other embodiments, different types of fibers can be present in the film. The different types of fibers may comprise different materials, different fiber lengths, different fiber diameters or combinations thereof.

Figure 3:
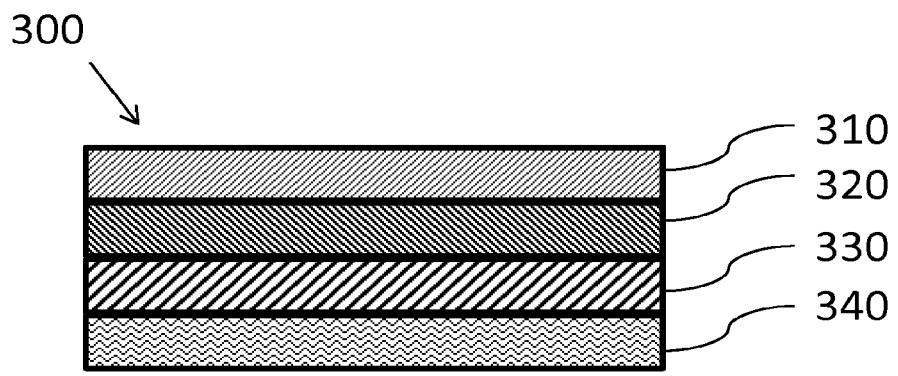
FIG. 3 is an illustration of a multi-layered frim, in accordance with certain examples.

In certain examples, the frim may comprise a stack of scrim/film layers coupled to each other. For example and referring to FIG. 3, a frim 300 comprises a layered stack comprising a scrim 310 disposed on a first layer 320. The first layer 320 is disposed on a second layer 330. An additional layer 340 may be present in the frim as well. In some embodiments, the first layer 320 may be a film, a different scrim than the scrim 310 or other materials. For example, the first layer 320 may comprises barrier properties that can impart desired properties to the final article that includes the frim. The second layer 320 may be a film, scrim or other material such as, for example, a barrier layer. The additional layer may also be a film, scrim or other material such as, for example, a barrier layer. In certain instances, the first layer 320 may be an adhesive layer, the second layer 330 may be a film layer and the additional layer 340 may be another adhesive layer which can be used, for example, to attach the frim 200 to a core layer as described herein. In other configurations, the scrim 310 may comprise polyethylene terephthalate, the second layer 320 may comprise polyethylene, the third layer 330 may comprise a polyamide and the additional layer 340 may comprise polyethylene. The particular shading shown in FIG. 3 is not limiting and is provided solely to provide visual distinction between the different layers.

In certain embodiments, where a frim is present, the overall basis weight of the frim can vary depending in the desired overall weight and properties of the articles comprising the frim. In some embodiments, the frim may comprise a basis weight of about 35 grams per square meter (gsm or g/m2) to about 120 gsm, more particularly, about 40 gsm to about 95 gsm, for example, about 45 gsm to about 75 gsm.

In certain examples, one or more layers of the frim may comprise colorants, dyes, pigments, particles, whiskers, fiber or other desired materials. In certain embodiments, one or more layers of the frim can include reinforcing materials. In some embodiments, the reinforcing materials present in any one layer of the frim can be one or more types of fibers. Illustrative types of fibers include, but are not limited to, glass fibers, carbon fibers, graphite fibers, synthetic organic fibers, particularly high modulus organic fibers such as, for example, para- and meta-aramid fibers, nylon fibers, polyester fibers, or any of the resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers present in the frim can be chemically treated prior to use to provide desired functional groups or to impart other physical properties to the fibers. The fiber content in the frim may be from about 5% to about 90%, more particularly from about 30% to about 70%, by weight of the frim. Typically, the fiber content of the frim varies between about 20% to about 90% by weight, more particularly between about 40% to about 80% by weight of the frim. The particular size and/or orientation of the fibers used may depend, at least in part, on the polymer material used and/or the desired properties of the resulting article. Suitable additional types of fibers, fiber sizes and amounts will be readily selected by the person of ordinary skill in the art, given the benefit of this disclosure. In some examples, fiber present in the frim generally have a diameter of greater than about 5 microns, more particularly from about 5 microns to about 22 microns, and a length of from about 5 mm to about 200 mm; more particularly, the fiber diameter may be from about 10 microns to about 22 microns, and the fiber length may be from about 5 mm to about 75 mm In certain embodiments, the fibers can be present in the scrim, in the film or in both the scrim and the film. In other embodiments, different types of fibers can be present in the scrim and the film of the frim or in other layers present in the frim. The different types of fibers may comprise different materials, different fiber lengths, different fiber diameters or combinations thereof.

In certain embodiments, the articles described herein can include a frim that is disposed on a core layer to provide a composite article. Such composites can provide a number of attributes, e.g., they can be molded and formed into a variety of suitable structural and non-structural articles without substantial sagging, including, but not limited to, an automotive structural component such as, for example, a bumper, an interior headliner, an underbody shield, a fender liner, a fender flare, a skid plate, a cross-member, a dashboard, and interior and exterior trim parts or interior or exterior panels. In other examples, the composites can be used as, or can be part of, a building panel, an acoustic panel, a vehicle panel, a lightweight structural member such as those present in a recreational vehicle or other applications where it may be desirable to use or include lightweight materials. In certain embodiments, traditional fiber composites used in exterior structural applications can be generally compression flow molded and can be substantially void free in their final part shape. By comparison, low density fiber composites used in automotive interior applications can be generally semi-structural in nature and are porous and lightweight with densities ranging from 0.1 to 1.8 $g/cm^3$ and containing 5% to 95% voids distributed uniformly through the thickness of the finished part. Certain automotive specifications desire light weight, good flexural strength, low sag, impact resistance, and other mechanical properties, as well as good thermoformability characteristics and/or improved mechanical properties.

In certain embodiments, the frim may be produced by coupling or attaching a film to a scrim. Suitable suppliers of films and scrims include, but are not limited to, the Mondi Group (Vienna, Austria), Kurabo (Japan), Condako (Belgium) and many other suppliers.

In certain examples described herein, a composite article comprises a frim disposed on a core layer comprising one or more thermoplastic polymers. In some embodiments, the thermoplastic polymer of the core layer can be a polymer resin or a polymer rosin. Illustrative types of polymer resins include, but are not limited to, those based on a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyimide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers, mixtures and combinations thereof. In some embodiments, the resin can include two polymer resins, three polymer resins, four polymer resins or more. In other examples, different portions of the core can include different polymer material compositions. For example, a first area of the core can include a first polymeric resin, and a second area of the composite can include a second polymeric resin different from the first resin. Other resins may also be used that can be sufficiently softened by heat or other radiation to permit fusing and/or molding without being chemically or thermally decomposed (to any substantial degree) during processing or formation of the composite article. Such other suitable resins will be readily selected by the person of ordinary skill in the art, given the benefit of this disclosure.

In some embodiments, the resin of the core can be pre-processed or chemically treated prior to use in the composites described herein. For example, thermostabilizers, softening agents, viscosity modifiers, thickening agents, chaotropic agents, diluents or other materials can be added to the resins prior to their use to provide a composite article. In certain examples, a dispersing agent can be added to the resin to assist in mixing of the resin with other components used to provide the article.

In certain embodiments, the composite described herein can comprise, or be configured as, a lightweight composite or a thermoplastic composite, e.g., a lightweight reinforced thermoplastic (LWRT) composite. An example of such a composite is prepared by HANWHA AZDEL, Inc. and marketed or sold under the trademark SUPERLITE® sheet. Preferably, the areal density of such an LWRT is from about 400 grams per square meter (gsm) of the LWRT to about 4000 gsm, although the areal density may be less than 400 gsm or greater than 4000 gsm depending on the specific application needs. In some embodiments, the upper density can be less than about 4000 gsm. If desired, the composite may take other forms such as, for example, a glass mat thermoplastic composite or other configurations including a thermoplastic and two or more layers that are coupled to each other, e.g., laminated or adhered to each other.

In certain embodiments, the core of the composite article can include reinforcing materials such as, for example, fibers, whiskers, powders, particles, cross-linkable materials, or other materials that can increase the overall strength or impart a desired mechanical property to the core material. Where reinforcing materials are present, they can be present in a continuous or discontinuous form, homogenously throughout the core or localized or otherwise present in larger amounts in some areas compared to other areas. In embodiments where the reinforcing materials are fibers, the fibers can be arranged parallel to each other, orthogonal to each other or present in no particular angular orientation depending on the desired properties of the core material. Illustrative types of fibers for use in the core include, but are not limited to, glass fibers, carbon fibers, graphite fibers, synthetic organic fibers, particularly high modulus organic fibers such as, for example, para- and meta-aramid fibers, nylon fibers, polyester fibers, or any of the resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers present in the core can be chemically treated prior to use to provide desired functional groups or to impart other physical properties to the fibers.

In certain embodiments, the polymer core layer can include about 20% to about 80% by weight of fibers having an average length of between about 5 mm and about 200 mm, and about 20% to about 80% by weight of a wholly or substantially unconsolidated fibrous or particulate thermoplastic materials, where the weight percentages are based on the total weight of polymer core layer. In another embodiment, the polymer core layer of the composites herein includes about 30% to about 60% by weight of fibers. In some examples, fiber comprising an average length of between about 5 mm and about 25 mm are typically utilized in polymer core. Suitable additional fiber types include, but are not limited to, metal fibers, metalized inorganic fibers, metalized synthetic fibers, glass fibers, graphite fibers, carbon fibers, ceramic fibers, mineral fibers, basalt fibers, inorganic fibers, aramid fibers, kenaf fibers, jute fibers, flax fibers, hemp fibers, cellulosic fibers, sisal fibers, coir fibers, and combinations thereof. Additional suitable fibers will be readily selected by the person of ordinary skill in the art, given the benefit of this disclosure.

In certain embodiments, fibers including an average length of about 5 mm to about 200 mm can be added with thermoplastic powder particles, such as polypropylene powder that can provide a resin, to an agitated aqueous foam. In another embodiment, reinforcing fibers including an average length of about 5 mm to about 75 mm, or more particularly, about 5 mm to about 50 mm may be used. The components can be agitated for a sufficient time to form a dispersed mixture of the reinforcing fibers and thermoplastic powder in the aqueous foam. The dispersed mixture can then be laid down on any suitable support structure, for example, a wire mesh, and then the water can be evacuated through the support structure forming a web. The web can be dried and heated above the softening temperature of the thermoplastic powder. The web can be cooled and pressed to a predetermined thickness and cooled to produce a polymer core layer having a porosity of greater than 0%, more particularly between about 5% to about 95% by volume.

In some embodiments, the web can be heated above the softening temperature of the thermoplastic resins in the core layer to substantially soften the plastic materials and is passed through one or more consolidation devices, for example calendaring rolls, a laminating machine, a double belt laminator, an indexing press, a multiple daylight press, an autoclave, and other such devices used for lamination and consolidation of sheets and fabrics so that the plastic material can flow and wet out the fibers. The gap between the consolidating elements in the consolidation devices can be set to a dimension less than that of the unconsolidated web and greater than that of the web if it were to be fully consolidated, thus allowing the web to expand and remain substantially permeable after passing through the rollers. In one embodiment, the gap can be set to a dimension about 5% to about 10% greater than that of the web if it were to be fully consolidated. A fully consolidated web means a web that is fully compressed and substantially void free. A fully consolidated web would have less than about 5% void content and have negligible open cell structure.

In certain examples, particulate plastic materials may include short plastics fibers that can be included to enhance the cohesion of the web structure during manufacture. Bonding can be affected by utilizing the thermal characteristics of the plastic materials within the web structure. The web structure can be heated sufficiently to cause the thermoplastic component to fuse at its surfaces to adjacent particles and fibers. In one embodiment, the thermoplastic resin used to form the core layer can be, at least in part, in a particulate form. Suitable thermoplastics include any of those resins noted herein above, or other comparable resins that will be selected by the person of ordinary skill in the art, given the benefit of this disclosure. Generally, thermoplastic resins in particulate form need not be excessively fine.

In certain embodiments, the core can be porous, non-porous or includes areas which are porous while comprising other areas which are non-porous. The exact porosity present in the core can vary depending on the intended use of the composite. In certain embodiments, the polymer core can comprise a porosity greater than 0% by volume of the polymer core, more particularly between greater than 0% to about 95% by volume of the polymer core, and still more particularly between about 30% to about 70% by volume of the polymer core. While not required, it is also possible that the overall composite, which includes the polymer core and the frim, is non-porous or has a porosity within the aforementioned ranges, e.g., the porosity of the composite may generally be greater than 0% to about 95% of the total volume of the composite, more particularly between greater than 0% to about 95% by the total volume of the composite, and still more particularly between about 30% to about 70% by the total volume of the composite. In yet other examples, the core or the overall composite may comprise a porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. If desired the porosity of the core or the overall composite may be greater than 95%, e.g., may be about 96% or 97%.

In certain examples, the thermoplastic composite can be generally prepared using chopped glass fibers, an index resin and a thermoplastic polymer film or films and or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as the resin. To produce the thermoplastic composite, or components thereof, the resin, reinforcing materials and/or other additives can be added or metered into a dispersing foam contained in an open top mixing tank fitted with an impeller. Without wishing to be bound by any particular theory, the presence of trapped pockets of air of the foam can assist in dispersing the glass fibers and resin. In some examples, the dispersed mixture of glass and resin can be pumped to a head-box located above a wire section of a paper machine via a distribution manifold. The foam, not the glass fiber or resin, can then be removed as the dispersed mixture is provided to a moving wire screen using a vacuum, continuously producing a uniform, fibrous wet web. The wet web can be passed through a dryer at a suitable temperature to reduce moisture content and to melt or soften the resin. When the hot web exits the dryer, a surface layer such as, for example, a frim may be laminated onto the web by passing the web of glass fiber, thermoplastic resin and frim through the nip of a set of heated rollers. Additional layers may also be attached along with or in place of the frim to one side or to both sides of the web to facilitate ease of handling the glass fiber-reinforced core. The composite can then be passed through tension rolls and continuously cut (guillotined) into the desired size for later forming into a final article. Further information concerning the preparation of such LWRT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

Figure 4:
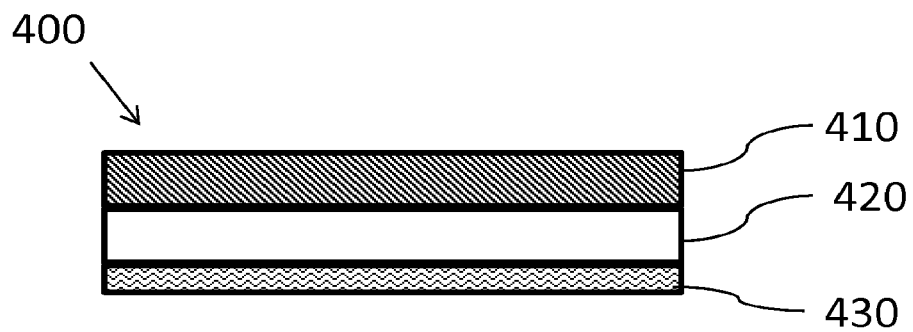
FIG. 4 is an illustration of a composite article comprising a frim and a core layer, in accordance with certain examples.

In certain embodiments and referring to FIG. 4, a composite article 400 comprising a frim 410 disposed on a core 420 and an additional layer 430 disposed on an opposite surface of the core 420 is shown. The frim 410 may be any one or more of the frims described herein including multi-layered frims, frims comprising a single scrim and a single film and other suitable frims. The core layer 420 may be any core layers described herein including, but not limited to, a thermoplastic composite layer or other suitable core layers. The additional layer 430 may be a film, a scrim, a fabric, adhesive or other suitable layers of material. In some embodiments, the additional layer 430 may include a thermoplastic polymer material and optionally reinforcing materials as described herein. For example, the additional layer may include a thermoplastic polymer, e.g., polypropylene, and optionally reinforcing fibers such as, for example, glass fibers. The exact thickness of each of the layers may vary depending on the desired final properties of the article 400.

Figure 5:
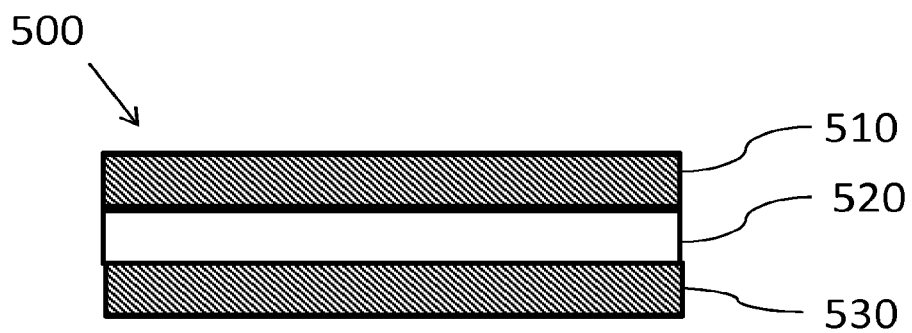
FIG. 5 is an illustration of a composite article comprising a frim, a core layer and a second layer on an opposite surface of the core layer, in accordance with certain examples.

In some embodiments and referring to FIG. 5, a composite article 500 comprising a frim 510 disposed on a core 520 and an additional frim 530 disposed on an opposite surface of the core 520 is shown. The frims 510 and 530 may be any one or more of the frims described herein including multi-layered frims, frims comprising a single scrim and a single film and other suitable frims. The frims 510 and 530 may be the same or may be different. In some examples, the frims 510 and 530 may include at least one common material, e.g., similar reinforcing fibers or similar thermoplastic polymers. The core layer 520 may be any core layers described herein including, but not limited to, a thermoplastic composite layer, e.g., a LWRT composite layer, or other suitable core layers. The exact thickness of each of the frims 510 and 530 and the core layer 520 may vary depending on the desired final properties of the article 500. In some embodiments, one or both of the frims 510 and 530 may include at least one common material as present in the core layer 520.

In certain embodiments, the composite articles described herein can be produced using numerous methods. For example, the composite may generally be prepared in various forms, such as sheets or films, as layered materials on pre-formed substrates, or in other more rigid forms depending on the particular application desired. For certain applications, the composite can be provided in sheet form and may optionally include, in addition to the surface layers, one or more additional layers on one or both surfaces of such sheet. In one illustration, such additional surface or skin layers may be, for example, a film, non-woven scrim, a veil, an additional frim, a woven fabric, or combinations thereof. If desired, the surface layers may be air permeable and can substantially stretch and spread with the composite article during thermoforming and/or molding operations. In addition, such layers may be adhesive, such as a thermoplastic material (e.g., an ethylene acrylic acid copolymer or other such polymers) applied to the surface of the fiber-containing thermoplastic material. Generally, the areal density of the composite article, particularly when in sheet form, varies from about 150 gsm to about 4000 gsm, more particularly about 500 gsm to about 3000 gsm, e.g., about 300 gsm to about 500 gsm, or about 500 gsm to about 750 gsm or about 750 gsm to about 2500 gsm.

In certain embodiments, the composite materials described herein can be used to provide intermediate and final form articles, including construction articles or articles for use in automotive and other applications including, but not limited to, body panels, a parcel shelf, package tray, headliners, door module, instrument panel toppers, hood panels, side wall panels such as for recreational vehicles, cargo liners, front and/or rear pillar trim, a sunshade, and the like. Other such articles will be apparent to the skilled artisan. The composite material can be molded into various articles using numerous methods including, but not limited to, pressure forming, thermal forming, thermal stamping, vacuum forming, compression forming, and autoclaving. Illustrative methods are described, for example, in U.S. Pat. Nos. 6,923,494 and 5,601,679, and in DuBois and Pribble's "Plastics Mold Engineering Handbook", Fifth Edition, 1995, pages 468 to 498 and elsewhere.

In certain embodiments, the scrim of the frim, or the entire frim, can be effective to prevent substantial sag of the article during a forming operation such as heating, molding and the like. In some embodiments, the forming operation or process may occur from about 160° C. to about 240° C. e.g., about 180° C. to about 230° C. It will be recognized by the person of ordinary skill in the art, given the benefit of this disclosure, that the article may intentionally deform or otherwise be altered during the forming or processing operation. In some embodiments, the frim may be effective to prevent sag of the final formed article, of the article if used without further processing, when the article is placed in its use environment, e.g., as a headliner or part of a headliner, interior part or other suitable article.

Certain specific examples are described below to illustrate further some of the novel aspects of the technology described herein.

Example 1

A frim can be produced by coupling a scrim to a film. In particular, a scrim can be disposed on a film and if desired held temporarily in place using adhesive spots or spot welds. The composite can be passed through a laminator or set of heated rollers to compress the article and couple the scrim and film to each other to provide a frim.

In some embodiments, the scrim can comprise polyethylene terephthalate and the film can comprise a polyamide such as, for example, nylon 6. In other embodiments, the scrim can comprise polyethylene terephthalate and the film can comprise polypropylene. In other embodiments, the scrim can comprise a material other than polyethylene terephthalate and the film can comprise a polyamide such as nylon 6. In certain embodiments, the scrim can comprise a material other than polyethylene terephthalate and the film can comprise polypropylene.

Example 2

A composite article can be produced by coupling a frim to a thermoplastic core layer. In some embodiments, a frim comprising a polyethylene terephthalate scrim and a polypropylene film can be disposed on a core layer comprising polypropylene and chopped glass fibers. If desired the frim may be held temporarily in place using adhesive spots or spot welds.

The composite can be passed through a laminator or set of heated rollers to compress the article and couple the frim and core layer to each other to provide a final article.

Example 3

The article produced in Example 2 can be used to dispose an additional layer on an opposite surface of the final article. In some embodiments, the additional layer can be a polypropylene film.

Example 4

A composite article can be produced by coupling a frim to a thermoplastic core layer. In some embodiments, a frim comprising a polyethylene terephthalate scrim and a nylon 6 film can be disposed on a core layer comprising polypropylene and chopped glass fibers. If desired the frim may be held temporarily in place using adhesive spots or spot welds.

The composite can be passed through a laminator or set of heated rollers to compress the article and couple the frim and core layer to each other to provide a final article.

Example 5

The article produced in Example 4 can be used to dispose an additional layer on an opposite surface of the final article. In some embodiments, the additional layer can be a polypropylene film.

Example 6

A composite article can be produced by coupling a frim to a thermoplastic core layer. In some embodiments, a multi-layered frim comprising a polyethylene terephthalate scrim, a film, and a polyethylene layer between the scrim and the film can be disposed on a core layer comprising polypropylene and chopped glass fibers. If desired the frim may be held temporarily in place using adhesive spots or spot welds.

The composite can be passed through a laminator or set of heated rollers to compress the article and couple the scrim and film to each other to provide a final article. If desired, an additional polyethylene layer can be present between the film and the core layer.

Example 7

The article produced in Example 6 can be used to dispose an additional layer on an opposite surface of the final article. In some embodiments, the additional layer can be a polypropylene film. If desired, an additional polyethylene layer can be present between the core layer and the additional layer.

Example 8

A composite article can be produced by coupling a frim to a thermoplastic core layer. In some embodiments, a multi-layered frim comprising a polyethylene terephthalate scrim, a nylon 6 film, and a polyethylene layer between the scrim and the film can be disposed on a core layer comprising polypropylene and chopped glass fibers. If desired the frim may be held temporarily in place using adhesive spots or spot welds.

The composite can be passed through a laminator or set of heated rollers to compress the article and couple the scrim and film to each other to provide a final article. If desired, an additional polyethylene layer can be present between the film and the core layer.

Example 9

The article produced in Example 8 can be used to dispose an additional layer on an opposite surface of the final article. In some embodiments, the additional layer can be a polypropylene film. If desired, an additional polyethylene layer can be present between the core layer and the additional layer.

Example 10

A composite article can be produced by disposing a frim comprising a 47 gsm film layer and a 45 gsm scrim layer. The basis weight of the core material can be about 550-650 gsm, which provides an overall basis weight of the article of about 730 gsm to about 830 gsm.

Example 11

An article can be produced according to Example 10 where the frim is substituted with a 62 gsm frim comprising a film with a basis weight of about 45 gsm and a scrim with a basis weight of about 17 gsm.

Example 12

An article can be produced according to Example 10 where the frim is substituted with a 72 gsm frim comprising a film with a basis weight of about 55 gsm and a scrim with a basis weight of about 17 gsm.

Example 13

An article can be produced according to Example 10 where the frim is substituted with a 64 gsm frim comprising a film with a basis weight of about 45 gsm and a scrim with a basis weight of about 19 gsm.

Example 14

An article can be produced according to Example 10 where the frim is substituted with a 92 gsm frim comprising a film with a basis weight of about 47 gsm and a scrim with a basis weight of about 45 gsm.

Example 15

An article can be produced according to Example 10 where the frim is substituted with a 65 gsm frim comprising a film with a basis weight of about 48 gsm and a scrim with a basis weight of about 17 gsm.

Example 16

An article can be produced according to Example 10 where the frim is substituted with a 76 gsm frim comprising a film with a basis weight of about 56 gsm and a scrim with a basis weight of about 20 gsm.

Example 17

An article can be produced according to Example 10 where the frim is substituted with a 43 gsm frim comprising a film with a basis weight of about 24 gsm and a scrim with a basis weight of about 19 gsm.

Example 18

An article can be produced according to Example 10 where the frim is substituted with a 41 gsm frim comprising a film with a basis weight of about 22 gsm and a scrim with a basis weight of about 19 gsm.

Example 19

An article can be produced according to Example 10 where the frim is substituted with a 58 gsm frim comprising a film with a basis weight of about 28 gsm and a scrim with a basis weight of about 30 gsm.

Example 20

An article can be produced according to Example 10 where the frim is substituted with a 58 gsm frim comprising a film with a basis weight of about 29 gsm and a scrim with a basis weight of about 29 gsm.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A method of producing an automotive interior vehicle part, the method comprising:
    forming a fiber reinforced thermoplastic polymer porous core layer by mixing reinforcing fibers, a thermoplastic polymer and a
        dispersing foam to provide a foam mixture of the reinforcing fibers and the thermoplastic polymer;
        disposing the foam mixture on a moving screen;
        evacuating the foam from the disposed foam mixture to form a web of open cell structures comprising the reinforcing fibers and the thermoplastic polymer;
        drying the web to form the fiber reinforced thermoplastic porous core layer, wherein the formed fiber reinforced thermoplastic polymer porous core layer comprises an areal density of 500 gsm to 3000 gsm;
    disposing a frim on a first surface of the formed fiber reinforced thermoplastic polymer porous core layer, wherein the frim comprises a film component coupled to a scrim component, and wherein the scrim is continuous from side to side of the film component, wherein the film component comprises a plurality of layers and a basis weight of 15 gsm to 75 gsm, wherein at least one of the plurality of layers of the film comprises a polyamide or polyethylene, and wherein the scrim comprises a basis weight of at least 15 gsm to prevent sag of the article during a forming operation;
    disposing a skin layer on a second surface of the formed fiber reinforced thermoplastic polymer porous core layer to form a thermoplastic composite article, wherein the formed fiber reinforced thermoplastic polymer porous core layer is positioned between the film component of the disposed frim and the disposed skin layer; and
    molding the formed thermoplastic composite article to form the automotive interior vehicle part, wherein the basis weight of the scrim of the formed thermoplastic composite article prevents sag of the formed thermoplastic composite article during the molding to form the automotive interior vehicle part.

2. The method of claim 1, further comprising disposing a foam layer on the scrim component of the formed thermoplastic composite article prior to molding the thermoplastic composite article.

3. The method of claim 1, further comprising disposing a fabric layer on the disposed foam layer prior to molding the thermoplastic composite article.

4. The method of claim 1, further comprising configuring the skin layer as an additional frim, wherein the additional frim comprises a film component and a scrim component.

5. The method of claim 4, wherein the frim and the additional frim are different.

6. The method of claim 4, wherein the frim and the additional frim are identical.

7. The method of claim 1, further comprising configuring the skin layer to include a thermoplastic polymer material with reinforcing materials.

8. The method of claim 1, wherein the scrim component comprises areas of different basis weight and wherein at least one area of the scrim comprises a basis weight of at least 30 gsm.

9. The method of claim 1, wherein the scrim component comprises a basis weight of at least 45 gsm and a melting point greater than 250 ° C.

10. The method of claim 1, wherein the film component comprises a first polyethylene layer coupled to a polyamide layer and a second polyethylene layer coupled to the polyamide layer.

11. The method of claim 1, wherein the scrim component comprises a basis weight of at least 30 gsm and the film component comprises a basis weight of at least 30 gsm up to 75 gsm.

12. The method of claim 1, wherein the scrim component comprises a basis weight of at least 50 gsm and the film component comprises a basis weight of at least 50 gsm up to 75 gsm.

13. The method of claim 1, wherein the scrim component comprises polyethylene terephthalate and the film component comprises the polyamide, and wherein the scrim component comprises a basis weight of at least 30 gsm.

14. The method of claim 1, wherein the scrim comprises a basis weight of about 30 gsm to about 75 gsm, wherein the scrim comprises fibers and a melting point greater than 250° C.

15. The method of claim 1, wherein the thermoplastic polymer of the web comprises a polyolefin and the reinforcing fibers of the web comprise glass fibers.

16. The method of claim 15, wherein the polyolefin is polypropylene.

17. The method of claim 1, in which a layer of the plurality of layers of the film component is the polyamide.

18. The method of claim 1, wherein at least one layer of the plurality of layers of the film component comprises the polyamide, the scrim comprises polyethylene terephthalate, a basis weight of the polyamide is about 20 gsm to about 55 gsm, a basis weight of the polyethylene terephthalate scrim is about 30 gsm to about 75 gsm, a basis weight of the formed fiber reinforced thermoplastic porous core layer is about 550 gsm to about 650 gsm, the thermoplastic polymer of the fiber reinforced thermoplastic porous core layer is polypropylene, the reinforcing fibers of the formed fiber reinforced thermoplastic porous core layer are glass fibers, wherein the skin layer comprises a polyolefin film disposed on the second surface of the formed fiber reinforced thermoplastic porous core layer, and an overall basis weight of the formed thermoplastic composite article is about 730 gsm to about 830 gsm.

19. The method of claim 1, wherein at least one layer of the plurality of layers of of the film component of the frim is a polypropylene film layer, wherein the scrim component of the frim is a polyethylene terephthalate scrim, wherein the formed fiber reinforced thermoplastic porous core layer comprises polypropylene and the glass fibers in the web, and wherein the skin layer comprises a polyolefin film disposed on the second surface of the formed fiber reinforced thermoplastic porous core layer.

20. The method of claim 1, wherein the plurality of the layers of the film component comprises a first polyethylene layer, a polyamide layer, and a second polyethylene layer, wherein the scrim is a polyethylene terephthalate scrim, and wherein the formed fiber reinforced thermoplastic porous core layer comprises polypropylene and the glass fibers in the web, and wherein the skin layer comprises a polyolefin film disposed on the second surface of the formed fiber reinforced thermoplastic porous core layer.

* * * * *